Figures 1, 2:
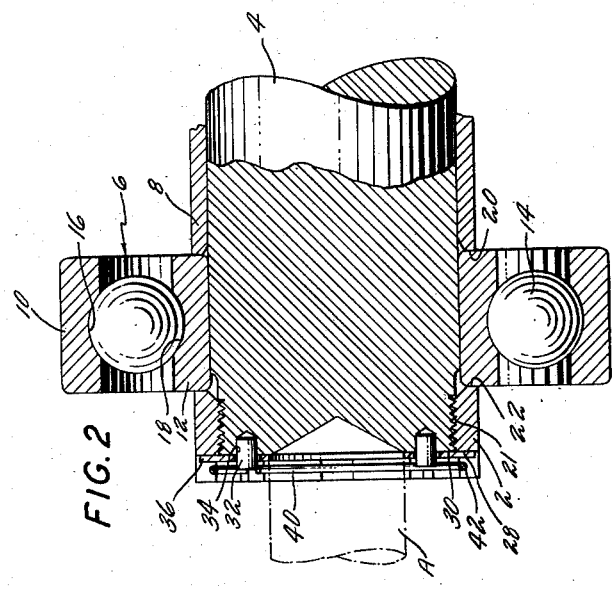

Nov. 19, 1957  G. H. NUTTER  2,813,565
NUT LOCKING RING MEANS WHICH CAN ASSUME A
PLURALITY OF ANGULAR POSITIONS
Filed March 4, 1954

INVENTOR
GEORGE H. NUTTER
BY Jack N. McCarthy
AGENT

United States Patent Office 2,813,565
Patented Nov. 19, 1957

2,813,565

NUT LOCKING RING MEANS WHICH CAN ASSUME A PLURALITY OF ANGULAR POSITIONS

George H. Nutter, Manchester, Conn., assignor to United Aircraft Corporation, East Hartford, Conn., a corporation of Delaware Application March 4, 1954, Serial No. 414,062

1 Claim. (Cl. 151—28)

This invention relates to nut retaining means and refers more particularly to nut retaining means for high speed shafts.

An object of this invention is to provide a new and improved means for locking a nut in place and to allow convenient removal of the nut whenever necessary without destroying any of the parts, thereby permitting reuse of all parts.

Another object of this invention is to provide means for holding a nut in place even when the nut is subjected to high rotating speeds.

A further object of this invention is to provide means for retaining a nut on a small diameter shaft.

Other objects and advantages will be apparent from the specification and from the accompanying drawings which illustrate an embodiment of the invention.

Fig. 1 is an elevational view showing a nut being retained in position on the end of a shaft by an embodiment of the invention; and Fig. 2 is a view taken along the line 2—2 of Fig. 1 showing the shaft partially in full.

Referring to the figures, they show a nut 2 being retained in position on a shaft 4 to hold a bearing 6 in place against a fixed shoulder on shaft 4. The bearing 6 is of a conventional type being composed of three parts: (1) an outer bearing ring 10, (2) an inner bearing ring 12, and (3) balls 14. The balls 14 ride in a race 16 formed in the inner surface of outer ring 10 and a race 18 formed in the outer surface of inner ring 12.

Nut 2 which is threaded to the end of shaft 4 at 21 holds the bearing 6 onto shaft 4 by confining the movement of the inner bearing ring 12 between the circular edge 20 of shoulder 8 and the circular inner face 22 of the nut. The other annular face of nut 2 has a series of axially extending projections 24 located thereon with spaces 26 therebetween. There are eight of these projections 24 equally spaced on said face.

The depths of the spaces 26 are dimensioned so that the bottom surfaces 28 of the spaces lie in a plane approximately coinciding with the end face 30 of shaft 4. Two projections 32 extend from the face 30 of shaft 4. While these projections may be constructed in any manner they are shown as pins fixed in holes 34. An annular fastener 36 having four tabs 38 extending radially therefrom and being equally spaced therearound and having a series of holes 39 located adjacent its outer periphery, the number of holes being equal to twice an odd number, is positioned against the face 30 of shaft 4. The use of this number of holes provides for a greater selection of nut locking positions. The tabs 38 engage four of the spaces 26 and two of the holes 39 are positioned over the projections 32. To maintain said fastener in this position, a snap ring 40 is positioned in a groove 42 formed around the inner faces of projections 24.

As can be seen, nut 2 is now maintained on position in the end of shaft 4, and as the speed of shaft 4 increases snap ring 40 is made more difficult to remove in view of the centrifugal force applied. Further it is seen that the retaining means may be easily removed when necessary and is available for reuse. While the invention is shown on the free end of a shaft it is equally applicable to a shaft having a stepped down portion as shown in dot and dash lines at A providing an annular face.

What it is desired to obtain by Letters Patent is:

In combination, a high speed shaft of circular cross section, said shaft having an annular face, said shaft being threaded adjacent said face, a nut threadably mounted on the threaded portion of said shaft, said nut having at least eight projections extending axially away from the face of said shaft, said projections being equally spaced and defining axially open spaces of uniform width therebetween, two projections of uniform cross section extending axially from the annular face of said shaft, said second-named projections being spaced 180° apart from one another, an annular retainer, said annular retainer having four tabs extending outwardly in a radial direction from the outer circumference thereof and being equally spaced therearound, said annular retainer having a circular inner circumference adapted to be positioned around a shaft extension of circular cross section extending from said face, said tabs being movable into said axially open spaces between said first-named projections upon axial movement of said retainer, said annular retainer having at least six holes equally positioned in a circle extending completely therearound, the number of holes being equal to twice an odd number, said annular retainer being axially movable toward the face of said shaft to position any diametrically opposed pair of said holes one around each of the second-named projections extending from the face of said shaft for positioning said retainer in any of a plurality of angular positions relative to said shaft, a snap ring positioned in a groove formed on the inner side of said first projections to maintain said retainer in place.

References Cited in the file of this patent

UNITED STATES PATENTS

| 976,928 | Salisbury | Nov. 29, 1910 |
| 1,016,146 | Hawes | Jan. 30, 1912 |
| 1,420,737 | Palmgren | June 27, 1922 |

FOREIGN PATENTS

| 537,339 | France | Mar. 1, 1922 |
| 540,815 | Germany | Dec. 30, 1931 |